United States Patent

[11] 3,587,915

[72] Inventors Reiner Theobald
 Frankfurt am Main, Germany;
 Stephane Luc-Belmont, Neuilly sur Seine, France
[21] Appl. No. 763,768
[22] Filed Sept. 30, 1968
[45] Patented June 28, 1971
[73] Assignees Vereingte Deutsche Metallwerke AG
 Frankfurt, Germany;
 Compagnie de Saint Gobain
 Neuilly Sur Seine, France, fractional part interest to each
[32] Priority Oct. 4, 1967
[33] Germany
[31] P 15 86 815.2

[54] BOTTLE CARRIER OF PLASTICS MATERIAL
 1 Claim, 4 Drawing Figs.
[52] U.S. Cl. .................................................. 220/102, 220/97
[51] Int. Cl. ...................................................... B65d 75/00

[50] Field of Search................................................. 220/102, 116, 97 (C), 97 (D); 229/52 (BC), 28 (BC); 206/65 (A), 65 (C), 65 (E)

[56] References Cited
UNITED STATES PATENTS
| | | | |
|---|---|---|---|
| 2,821,327 | 1/1958 | Glazer.......................... | 220/102 |
| 3,115,266 | 12/1963 | Poupitch....................... | 220/102X |
| 3,463,353 | 8/1969 | Peebles......................... | 220/102X |

FOREIGN PATENTS
| | | | |
|---|---|---|---|
| 517,982 | 3/1953 | Belgium ........................ | 206/65(A) |
| 448,871 | 4/1968 | Switzerland.................. | 206/65(E) |

Primary Examiner—Joseph R. Leclair
Assistant Examiner—James R. Garrett
Attorney—Stephens, Huettig & O'Connell ABSTRACT: A structure which is W-shaped in cross section comprises longitudinal walls that define open-topped, longitudinal troughs for receiving bottles, which walls are formed with apertures having edges for holding such bottles in position in said troughs. Stiffening members extend across and connect the end edges of said walls at both ends of said structure adjacent the top of the walls.

INVENTORS
REINER THEOBALD
STEPHANE LUC-BELMONT

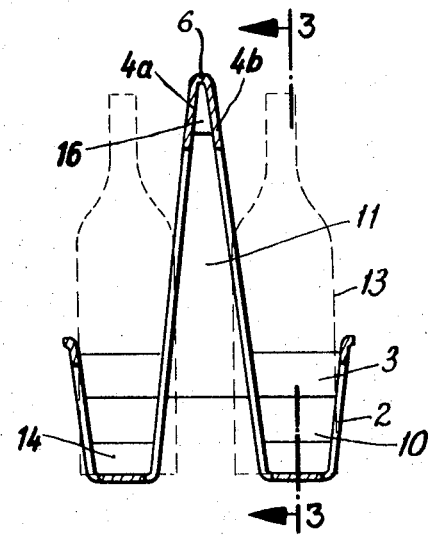
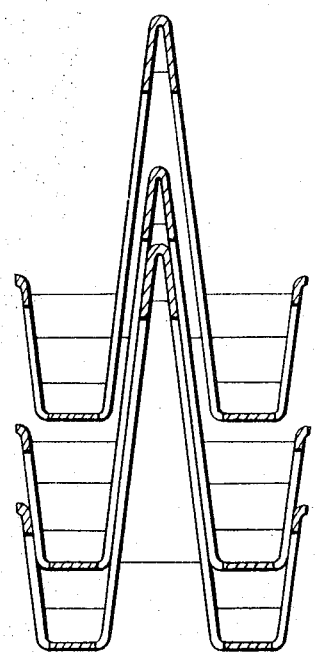
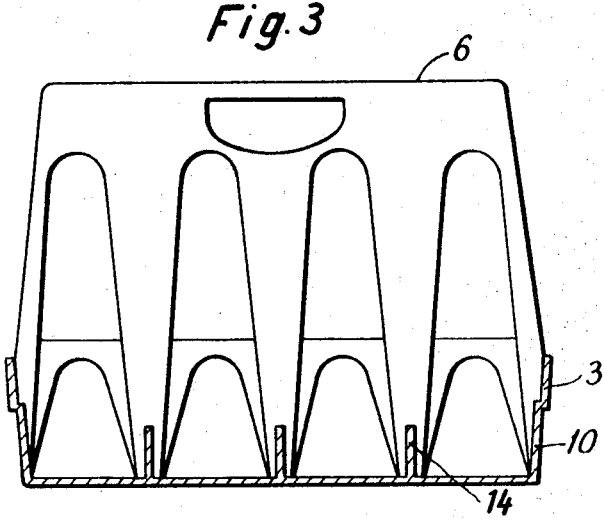

BOTTLE CARRIER OF PLASTICS MATERIAL

This invention relates to a bottle carrier of plastic material, preferably for discardable bottles, which carrier is W-shaped in cross section and has upwardly open, longitudinal troughs intended to receive the bottles, which are fixed in the walls of the longitudinal troughs by the edges of corresponding apertures. Such a bottle carrier made of sheet metal is known. It can be manufactured in that flat sheet metal is punched in the respective areas and is subsequently formed into the W shape. In view of the relatively high inherent stability of sheet metal, this structure will be preserved in a bottle carrier made from said material. The sheet metal cannot be readily replaced by plastics material.

It is an object of the invention to make a bottle carrier which has the W shape defined herein before and which is made from plastic material and has a high stability by the provision of simple additional elements. The object of the invention is accomplished in that the end edges of the longitudinal troughs are connected at each end of the structure by a transverse member. As a result, the bottle carrier in accordance with the invention, which is made of plastic material, is stabilized virtually in any dimension. An unfolding of the W structure in the longitudinal direction of the profiled transverse member provided according to the invention is avoided. The transverse members also prevent a deformation of the W structure under load in the vertical direction. The invention also improves the inherent stability of the longitudinal troughs of the W structure.

It is also proposed within the scope of the invention to form a handle in that one double wall is extended upwardly. The resulting extension must protrude above the top ends of the bottles in order to prevent the next upper carrier in a stack of carriers from resting on the bottles. For a further increase of the stability of the above-described carrier which can be stacked, the invention proposes to close all longitudinal troughs and/or the upwardly extended double walls at their ends. As a result, the carrier according to the invention has a particularly high stability against thrust forces, which often arise during a stacking operation as a result of lateral stresses and vibrations. It will also be desirable within the scope of the invention if the longitudinal troughs are provided with transverse stiffeners between the compartments intended to receive the bottles.

The invention will be explained with reference to the drawings, in which:

FIG. 2 is a sectional view taken on the line 2-2 of the bottle carrier shown in FIG. 1;

FIG. 3 is a sectional view taken on line 3-3 of FIG. 2 but modified to show additional trough end reinforcement;

FIG. 4 is a sectional view similar to that of FIG. 2 through a plurality of stacked empty bottle carriers according to the invention.

Figure 1:
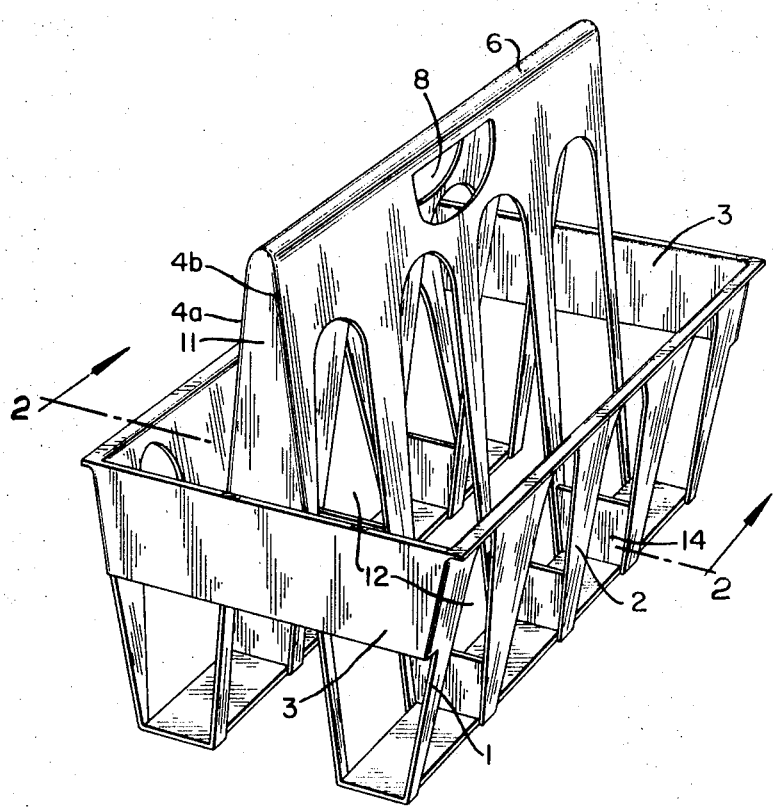
FIG. 1 is a perspective view showing a bottle carrier according to the invention with open ended troughs.

The invention is based on a bottle carrier having a W-shaped structure. According to the invention, the end edges 1 of the longitudinal troughs 2 are connected at each end of the carrier by a transverse member 3. The transverse member 3 according to the invention may be a simple flat member. To enable a stacking of the carriers and to form handles, the two double walls 4a, 4b are upwardly extended, as is shown in FIG. 1. These extended walls must have at least the same height as a bottle so that a next upper carrier in a stack of carriers will not rest on the bottles when the carriers are stacked with the walls of an upper carrier extending in a direction transverse to similar walls of two subjacent carriers. The edge 6 serves to support the next upper carrier in a stack. Desirable locking means may be provided, such as recesses or elevations on the contact surfaces of the carrier. The handle in FIG. 1 is designated 8. The stiffness is further improved in that the ends 11 of the extended walls are closed. Apertures 12 in the walls of the longitudinal troughs serve to hold the bottles in position.

FIG. 2 shows in dotted lines the bottles 13 which are to be received. It is also apparent from FIG. 3 that the longitudinal troughs may be provided with closed ends 10 and with transverse stiffeners 14 between the compartments serving to receive the bottles. Additional stiffening webs may be provided between the double walls 4a, 4b.

We claim:

1. A bottle carrier of plastic material comprising trough walls forming two parallel open-topped and upwardly flaring troughs and with adjacent trough walls having their upper edges interconnected, aperture means in said trough walls having edges for holding bottles in position in said troughs, transverse stiffening members extending across and connecting the end edges of said trough walls adjacent the top edges thereof on each end of said carrier, said interconnected trough walls having portions extended above said stiffening members, and handle apertures in said extended portions.